US005695875A

United States Patent [19]

Larsson et al.

[11] Patent Number: 5,695,875

[45] Date of Patent: Dec. 9, 1997

[54] PARTICLE BOARD AND USE THEREOF

[75] Inventors: Roland Larsson, Anderslov; Peter Ringö, Skurup, both of Sweden

[73] Assignee: Perstorp Flooring AB, Trelleborg, Sweden

[21] Appl. No.: 356,299

[22] PCT Filed: Jun. 23, 1993

[86] PCT No.: PCT/SE93/00555

§ 371 Date: Mar. 20, 1995

§ 102(e) Date: Mar. 20, 1995

[87] PCT Pub. No.: WO94/00280

PCT Pub. Date: Jan. 6, 1994

[30] Foreign Application Priority Data

Jun. 29, 1992 [SE] Sweden .................................. 9201982

[51] Int. Cl.$^6$ ................................ B27N 3/02; B32B 5/16

[52] U.S. Cl. ........................ 428/326; 428/327; 428/537.1

[58] Field of Search .................................... 428/326, 327, 428/537.1

[56] References Cited

U.S. PATENT DOCUMENTS 3,492,388 1/1970 Inglin-Knusel ......................... 264/129

*Primary Examiner*—Helen Lee

*Attorney, Agent, or Firm*—Scully, Scott, Murphy & Presser

[57] ABSTRACT

A particle board including wood particles having a maximum particle size of 3 mm and an average particle size of between 0.2 mm and 2.0 mm. The wood particles are combined with a glue, present in a concentration of 5% to 18% by weight, and 0.1% to 1% by weight of a sizing agent. The particle board components are subjected to a pressure of 15 to 50 kp/cm$^2$ and a temperature of 120° to 210° C. to produce a particle board having a density of 600 to 1200 kg/m$^3$ and a water absorption of 14% to 30% by weight, said swelling and absorption measured after 24 hours in water, a bending strength of 18 to 35 MPa and an internal bond strength of 1.2.

13 Claims, 1 Drawing Sheet

PARTICLE BOARD AND USE THEREOF

Figure 1:
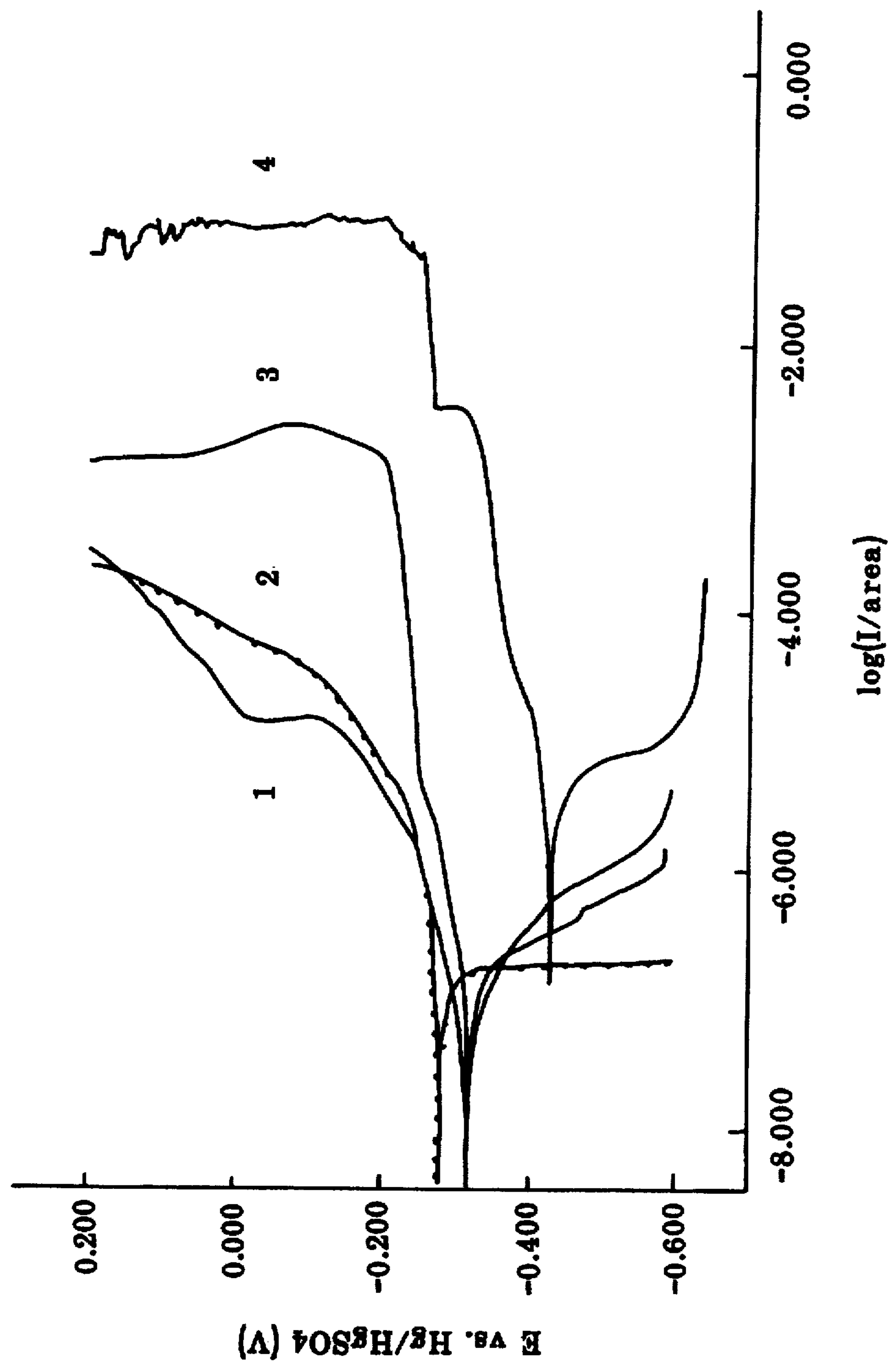

The present invention relates to a homogeneous particle board having considerably increased strength and resistance against moisture as well as the use thereof.

Particle boards have been produced for a very long time. Usually they serve their purpose in a very good way. However there is a problem with these known particle boards. Thus they are sensitive to moisture and swell easily in a moist environment. In addition the strength and the hardness are rather moderate.

There is a need for particle boards having a better strength, resistance against moisture and surface hardness. For instance these particle boards are needed as a carrier for so-called laminate floorings. Usually these floorings consist of a particle board having a thin decorative thermosetting laminate glued to its upper side. A balanced laminate is usually glued to the lower side of the carrier to give a dimensionally stable and even flooring material.

The carrier has usually a thickness of about 6–9 mm and the two laminate sheets a thickness of about 1 mm together. Accordingly the complete flooring material has a thickness of about 7–10 mm.

The laminate coated particle board is sawn up into a number of flooring boards which are provided with groove and tenon in the long sides and the short sides.

Bar patterns are very usual for such laminate floorings. The decorative thermosetting laminate is produced in the usual way. Usually you start with a base layer consisting of a number of paper sheeets impregnated with phenol-formaldehyde resin and a decor paper sheet impregnated with melamine-formaldehyde resin. There may also be an overlay of α-cellulose impregnated with melamine-formaldehyde resin. These sheets are bonded together to a laminate by pressing under heat and pressure.

Due to the fact that it has not been possible before to produce particle boards with enough strength, resistance against moisture and surface hardness it has not been possible to make laminate floorings which can stand a long time use in a public environment. In such spaces the floors are usually exposed to a higher moisture charge and a greater mechanical strain.

The surface hardness of the particle board is important for the resistance of the laminated floor against impression marks.

A high bending strength and internal bond of the particle board are important for obtaining a strong and resistant laminate floor.

Normally particle boards are manufactured by building up a mat of particles in several layers on a forming belt. Than the central layer or layers is usually built up of considerably bigger particles than the two outermost layers on each side of the central layer. Therefore the particle board made of the mat of particles will get the above mentioned drawbacks.

According to the present invention it has quite inexpectedly been possible to satisfy the above need and bring about a homogeneous particle Board having considerably increased strength and resistance against moisture. The board is characterized in that, it has a density of 600–1200 $kg/m^3$, preferably 850–1100 $kg/m^3$ a thickness swelling of 3–12%, preferably 4–7% after 24 hours in water, a water absorption of 14–30% by weight, preferably 15–28% by weight after 24 hours in water, a bending strength of 18–35 MPa, preferably at least 24 MPa and an internal bond of 1.2–3.2 MPa, preferably 2.0–3.2 MPa.

The particle board is built up of wooden particles having a maximal size of 3 mm. At a temperature of 10°–30°, preferably 15°–25° C. these particles are mixed with 5–18% by weight of glue calculated as dry glue on dry particles and 0.1–1.0% by weight of an sizing agent. This particle material mixed with glue is spread on a forming belt or the like in such a way that a mat of particles consisting of one to five preferably at least three layers is built up, which mat of particles is possibly prepressed and then flat pressed at a pressure of 15–50 $kp/cm^2$, preferably 20–40 $kp/cm^2$ and a temperature of 120°–210° C., preferably 130°–170° C.

Often all or mainly all particles in the board have a maximal size of 2 mm. Usually the sizing agent is wax.

Suitably the particles in all layers are within the same size interval.

According to one preferred embodiment of the invention 60–100% preferably at least 85% of the particles in all layers have a size ≦1 mm.

Normally the particle board according to the invention has a surface hardness of 4–5 $kp/cm^2$ measured according the Brinell Hardness Test, as set forth in ASTM Test Procedure E 10-84.

The tensile strength after boiling for 2 hours in water amounts to 0.2–0.9 MPa, preferably 0.4–0.9 MPa. This is a very high value considering the fact that standard particle boards disintegrate at such a treatment.

Normally the glue used according to the invention consists mainly or wholly of isocyanate glue, melamine-formaldehyde glue, melamine-urea-formaldehyde glue, melamine-urea-phenol-formaldehyde glue, urea-formaldehyde glue or a mixture of at least two of these.

Preferably the glue is used in the form of a liquid. Aqueous solutions are often most suitable even if solvent free liquid state glues are also useful.

According to one preferred embodiment of the invention the particles are mixed with 10.0–15.0% by weight of glue calculated in the above way. Then the glue consists of melamine-formaldehyde glue, urea-formaldehyde glue, melamine-urea-formaldehyde glue, melamine-urea-phenol-formaldehyde glue or a mixture of at least two of these.

Normally the completely pressed particle board is ground when it has been taken out of the press.

As mentioned above, the invention also comprises the use of the particle board as a carrier for laminate flooring boards. Such boards comprise a thin decorative thermosetting laminate glued to the upper side of the carrier and usually a balanced laminate glued to the under side of the carrier. The laminate flooring boards are provided with groove and tenon in the short sides and the long sides.

Of course the particle board can be used for other purposes than as a carrier in laminate floorings.

The invention will be further explained in connection with the embodiment examples below of which examples 1, 3, 4, 5, 6 and 7 relate to a particle board according to the invention. Example 2 shows the properties of previously known particle boards. Example 8 relates to a production of a laminate flooring with a carrier consisting of a standard particle board disclosed in example 2. Example 9 illustrates the production of a laminate flooring with a carrier produced according to example 1.

EXAMPLE 1

Sawdust was ground in a mill and then dried to a water content of 1.5% by weight. The ground and dried particles obtained were sieved through a sieve having a mesh size of 2×2 mm.

The particles which passed the sieve were used for the formation of a three layer particle board with a central layer surrounded by one surface layer on each side. The particles for the surface layers were mixed with 14% glue and 0.75% wax calculated as dry glue on dry particles. The glue wholly consisted of melamine-urea-phenol-formaldehyde glue in the form of an aqueous solution. The particles for the central layer were mixed with 12.9% of the same glue and 0.9% wax calculated in the same way.

The particles mixed with glue were spread on a forming belt in such a way that a particle mat with three layers was built up. The particle mat was prepressed between rolls at room temperature and then flat pressed at a temperature of 145° C. and a press of 30 $kp/cm^2$.

The particle boards produced were allowed to cool down whereupon they were ground to a thickness of 6.0 mm. The properties of the particle boards were measured and the following values were obtained.

| | |
|---|---|
| Density | 918 $kg/m^3$ |
| Thickness swelling after 24 h in water | 9.2% |
| Water absorption after 24 h in water | 28.5% |
| Bending strength | 25.4 MPa |
| Internal bond | 2.63 MPa |
| Surface hardness according to Brinell | 4.17 $kp/cm^2$ |
| Internal bond after boiling for 2 h | 0.55 $kp/cm^2$ |

EXAMPLE 2

The properties of two known types of particle boards were measured relating-to the same properties as according to example 1. One particle board was a standard board and the other an especially moisture resistant board sold under the designation V 313. The following values were obtained.

| | Standard board | V 313 |
|---|---|---|
| Density | 700 $kg/m^3$ | 770 $kg/m^3$ |
| Thickness swelling after 24 h in water | 24% | 14% |
| Water absorption after 24 h in water | 55% | 35% |
| Bending strength | 14 MPa | 18.5 MPa |
| Internal bond | 0.6 MPa | 1.4 MPa |
| Surface hardness according to Brinell | 2.0 $kp/cm^2$ | 3.5 $kp/cm^2$ |
| Internal bond after boiling for 2 h | The board disintegrated | 0.20 MPa |

EXAMPLE 3

Sawdust was ground in a mill and then dried to a water content of 2.5% by weight. The ground and dried particles obtained were sieved through a sieve having a mesh size of 2×2 mm.

The particles which passed the sieve were used for the formation of a three layer particle board with a central layer surrounded by one surface layer on each side. The particles for the surface layers were mixed with 14% glue and 0.75% wax calculated as dry glue on dry particles. The glue wholly consisted of msiamine-urea-formaldehyde glue in the form of an aqueous solution. The particles for the central layer were mixed with 13.0% of the same glue and 0.9% wax calculated in the same way.

The particles mixed with glue were spread on a forming belt in such a way that a particle mat with three layers was built up. The particle mat was not prepressed. Flat pressing took place at a temperature of 145° C. and a pressure of 40 $kp/cm^2$.

The particle boards produced were allowed to cool down whereupon they were ground to a thickness of 6.0 mm. The properties of the particle boards were measured and the following values were obtained.

| | |
|---|---|
| Density | 918 $kg/m^3$ |
| Thickness swelling after 24 h in water | 5.3% |
| Water absorption after 24 h in water | 17.5% |
| Bending strength | 34.7 MPa |
| Internal bond | 2.85 MPa |
| Surface hardness according to Brinell | 4.53 $kp/cm^2$ |
| Internal bond after boiling for 2 h | 0.83 $kp/cm^2$ |

EXAMPLE 4

Sawdust was ground in a mill and then dried to a water content of 2–3% by weight. The ground and dried particles obtained were sieved through a sieve having a mesh size of 2×2 mm.

The particles which passed the sieve were used for the formation of a three layer particle boards with a central layer surrounded by one surface layer on each side. The particles for the surface layers were mixed with 12% glue and 0.75% wax calculated as dry glue on dry particles. The glue consisted of a mixture of 50% melamine-urea-phenol-formaldehyde glue and 50% urea-formaldehyde glue in the form of an aqueous solution. The particles for the central layer were mixed with 14.0% glue and 0.9% wax calculated in the same way. The glue wholly consisted of melamine-urea-phenol-formaldehyde glue.

The particles mixed with glue were spread on a forming belt in such a way that a particle mat with three layers was built up. The particle mat was prepressed between rolls at a temperature of 18° C. and then flat pressed at a temperature of 160° C. and a pressure of 38 $kp/cm^2$.

The particle boards produced were allowed to cool down whereupon they were ground to a thickness of 6.0 mm. The properties of the particle boards were measured and the following values were obtained.

| | |
|---|---|
| Density | 901 $kg/m^3$ |
| Thickness swelling after 24 h in water | 8.1% |
| Water absorption after 24 h in water | 26.3% |
| Bending strength | 24.2 MPa |
| Internal bond | 2.20 MPa |
| Surface hardness according to Brinell | 4.51 $kp/cm^2$ |
| Internal bond after boiling for 2 h | 0.57 $kp/cm^2$ |

EXAMPLE 5

Sawdust was ground in a mill and then dried to a water content of 2.5% by weight. The ground and dried particles obtained were sieved through a sieve having a mesh size of 1.5×1.5 mm.

The particles which passed %he sieve were used for the formation of a one layer particle board. The particles were mixed with 13% glue and 0.75% wax calculated as dry glue on dry particles. The glue consisted of a mixture of 80% melamine-urea-phenol-formaldehyde glue and 20% urea-formaldehyde glue in the form of an aqueous solution.

The particles mixed with glue were spread on a forming belt in such a way that a particle mat with one layer was built up. The particle mat was prepressed between rolls at at temperature of 21° C. and then flat pressed at a temperature of 160° C. and a pressure of 38 kp/cm$^2$.

The particle boards produced were allowed to cool down whereupon they were ground to a thickness of 6.0 mm. The properties of the particle boards were measured and the following values were obtained.

| | |
|---|---|
| Density | 902 kg/m$^3$ |
| Thickness swelling after 24 h in water | 5.9% |
| Water absorption after 24 h in water | 21.1% |
| Bending strength | 26.2 MPa |
| Internal bond | 2.35 MPa |
| Surface hardness according to Brinell | 4.70 kp/cm$^2$ |
| Internal bond after boiling for 2 h | 0.62 kp/cm$^2$ |

EXAMPLE 6

A mixture of sawdust and cutterdust was ground in a mill and then dried to a water content of 2.5% by weight. The ground and dried particles obtained were sieved through a sieve having a mesh size of 1.5×1.5 mm.

The particles which passed the sieve were used for the formation of a three layer particle board with a central layer surrounded by one surface layer on each side. The particles for the surface layers were mixed with 14% glue and 0.75% wax calculated as dry glue on dry particles. The glue wholly consisted of melamine-urea-phenol-formaldehyde glue in the form of an aqueous solution. The particles for the central layer were mixed with 14.0% of the same glue and 0.9% wax calculated in the same way.

The particles mixed with glue were spread on a forming belt in such a way that a particle mat with three layers was built up. The particle mat was prepressed between rolls at a temperature of 23° C. and then flat pressed at a temperature of 160° C. and a pressure of 40 kp/cm$^2$.

The particle boards produced were allowed to cool down whereupon they were ground to a thickness of 6.0 mm. The properties of the particle boards were measured and the following values were obtained.

| | |
|---|---|
| Density | 938 kg/m$^3$ |
| Thickness swelling after 24 h in water | 5.3% |
| Water absorption after 24 h in water | 19,6% |
| Bending strength | 28.3 MPa |
| Internal bond | 2.60 MPa |
| Surface hardness according to Brinell | 4.46 kp/cm$^2$ |
| Internal bond after boiling for 2 h | 0.41 kp/cm$^2$ |

EXAMPLE 7

Sawdust was ground in a mill and then dried to a water content of 1.5% by weight. The ground and dried particles obtained were sieved through a sieve having a mesh size of 2×2 mm.

The particles which passed the sieve were used for the formation of a three layer particle board with a central layer surrounded by one surface layer on each side. The particles for the surface layers were mixed with 13.9% glue and 0.75% wax calculated as dry glue on dry particles. The glue wholly consisted of melamine-urea-phenol-formaldehyde glue in the form of an aqueous solution. The particles for the central layer were mixed with 13.4% of the same glue and 0.9% wax calculated in the same way.

The particles mixed with glue were spread on a forming belt in such a way that a particle mat with three layers was built up. The particle mat was prepressed between rolls at a temperature of 22° C. and then flat pressed at a temperature of 145° C. and a pressure of 30 kp/cm$^2$. The particle boards were allowed to cool down whereupon they were ground to a thickness of 6.0 mm. The properties of the particle boards were measured and the following values were obtained.

| | |
|---|---|
| Density | 911 kg/m$^3$ |
| Thickness swelling after 24 h in water | 8.3% |
| Water absorption after 24 h in water | 24,6% |
| Bending strength | 24.2 MPa |
| Internal bond | 2.20 MPa |
| Surface hardness according to Brinell | 4.13 kp/cm$^2$ |
| Internal bond after boiling for 2 h | 0.60 kp/cm$^2$ |

EXAMPLE 8

A particle board produced according to example 1 with a thickness of 6 mm was provided with glue on both sides. A 0.7 mm thick decorative thermosetting laminate was placed on the upper side of the particle board and a 0.3 mm thick balanced laminate was placed on the lower side. These three layers were then pressed together in a heated press at a temperature of 100° C. and a pressure of 5 kp/cm$^2$.

After cooling to room temperature the whole board was sawn up to flooring boards with a size of 200×1200 mm. By means of cutting the short sides and the long sides were provided with groove and tenon.

The properties of the finished flooring boards were measured and the following results were obtained.

| | |
|---|---|
| Density | 1057 kg/m$^3$ |
| Thickness swelling after 24 h in water | 0.5% |
| Water absorption after 24 h in water | 7.7% |
| Impact resistance | 45 N |
| Depth of indentation from a falling object from a height of 800 mm | 0.00 mm |
| Depth of indentation from a falling object from a height of 1250 mm | 0.10 mm |

EXAMPLE 9

The process according to example 8 was repeated with the difference that the carrier consisted of a standard particle board disclosed in example 2.

The properties of the finished flooring boards were measured and the following results were obtained.

| | |
|---|---|
| Density | 805 kg/m$^3$ |
| Thickness swelling after 24 h in water | 16.1% |
| Water absorption after 24 h in water | 52.4% |
| Impact resistance | 27 N |
| Depth of indentation from a falling object from a height of 800 mm | 0.53 mm |
| Depth of indentation from a falling object from a height of 1250 mm | 2.50 mm |

We claim:

1. A particle board comprising wood particles having a maximum particle size of 3 mm and an average particle size of between 0.2 mm and 2.0 mm combined, at a temperature of 10° C. to 30° C., with a glue, present in a concentration of 5% to 18% by weight, calculated as dry glue on dry particles, and 0.1% to 1% by weight of a sizing agent, said components combined into a mat of 1 to 5 layers which is flat pressed, at a pressure of 15 kp/cm$^2$ to 50 kp/cm$^2$ and a temperature of 120° C. to 210° C., after, optionally, being prepressed whereby a particle board having a density of 600 kg/m$^3$ to 1200 kg/m$^3$, a thickness swelling of 3% to 12%, a water absorption of 14% to 30% by weight, said swelling and absorption measured after 24 hours in water, a bending strength of 18 MPa to 35 MPa and an internal bond strength of 1.2 MPa to 3.2 MPa is formed.

2. A particle board in accordance with claim 1 wherein said particles, glue and sizing agent are combined at a temperature of 15° C. to 25° C. on a forming belt to form said mat, said mat formed of three layers flat pressed at a pressure of 20 kp/cm$^2$ to 40 kp/cm$^2$ and at a temperature of 130° C. to 170° C. whereby said particle board has a density of 850 kg/m$^3$ to 1100 kg/m$^3$, a thickness swelling of 4% to 7%, a water absorption of 15% to 28% by weight, a bending strength of 42 MPa to 35 MPa and an internal bond of 2.0 MPa to 3.2 MPa.

3. A particle board in accordance with claim 2 wherein said particle board has a tensile strength of 0.4 MPa to 0.9 MPa after being exposed to water for 2 hours.

4. A particle board in accordance with claim 3 wherein said glue is selected from the group consisting of isocyanate glue, melamine formaldehyde glue, melamine-urea formaldehyde glue, melamine-urea-phenol formaldehyde glue, urea formaldehyde glue and mixtures of two or more of the above, said glue present in said particle board in a concentration of 10% to 15% by weight.

5. A laminate flooring board comprising a carrier formed of the particle board of claim 2, a thin decorative thermosetting layer glued to the top side of said carrier and a layer, to balance said decorative layer, glued to the bottom side of said carrier, said laminate flooring board provided with groove and tenon on both the long and short sides.

6. A particle board in accordance with claim 1 wherein the size of the wood particles is the same in each of said layers.

7. A particle board in accordance with claim 1 wherein the wood particles have a maximum size of 2 mm.

8. A particle board in accordance with claim 7 wherein 60% to 100% of said wood particles have a size no greater than 1 mm.

9. A particle board in accordance with claim 1 wherein said particle board has a Brinell surface hardness of 4 kp/cm$^2$ to 5 kp/cm$^2$, as measured by ASTM Test Procedure E 10-84.

10. A particle board in accordance with claim 1 wherein said particle board has a tensile strength of 0.2 MPa to 0.9 MPa after being exposed to boiling water for 2 hours.

11. A particle board in accordance with claim 1 wherein said glue is selected from the group consisting of isocyanate glue, melamine formaldehyde glue, melamine-urea formaldehyde glue, melamine-urea-phenol formaldehyde glue, urea formaldehyde glue and mixtures of two or more of the above.

12. A particle board in accordance with claim 1 wherein said particle board is ground to the desired thickness after being flat pressed.

13. A laminate flooring board comprising a carrier formed of the particle board of claim 1.

* * * * *

UNITED STATES PATENT AND TRADEMARK OFFICE

CERTIFICATE OF CORRECTION

PATENT NO. : 5,695,875

DATED : December 9, 1997

INVENTOR(S) : Roland Larsson, et al.

It is certified that error appears in the above-identified patent and that said Letters Patent is hereby corrected as shown below:

Delete Figure 1.

Column 3, line 11: "press" should read --pressure--

Column 3, line 58: "msiamine" should read --melamine--

Column 4, line 7: "918" should read --981--

Column 4, line 62: "%he" should read --the--

Signed and Sealed this

Thirtieth Day of March, 1999

*Attest:*

Q. TODD DICKINSON

*Attesting Officer*

*Acting Commissioner of Patents and Trademarks*